(12) United States Patent
Qiang et al.

(10) Patent No.: US 11,074,014 B1
(45) Date of Patent: Jul. 27, 2021

(54) MANAGING ADJACENT TRACK INTERFERENCE IN A DATA STORAGE DEVICE

(71) Applicant: Seagate Technology LLC, Cupertino, CA (US)

(72) Inventors: Jian Qiang, Singapore (SG); Mark A. Gaertner, Vadnais Heights, MN (US); Kay Hee Tang, Singapore (SG); Chee Hou Peng, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 95 days.

(21) Appl. No.: 16/548,467

(22) Filed: Aug. 22, 2019

(51) Int. Cl.
*G06F 3/06* (2006.01)

(52) U.S. Cl.
CPC .......... *G06F 3/0659* (2013.01); *G06F 3/0604* (2013.01); *G06F 3/0656* (2013.01); *G06F 3/0673* (2013.01)

(58) Field of Classification Search
CPC .................................................... G06F 3/0659
USPC ............................................................. 711/4
See application file for complete search history.

(56) References Cited

U.S. PATENT DOCUMENTS

| | | | |
|---|---|---|---|
| 5,940,238 A | 8/1999 | Nayak et al. | |
| 7,227,708 B2 | 6/2007 | Feng | |
| 7,522,366 B2 | 4/2009 | Mettler et al. | |
| 7,575,820 B2 | 8/2009 | Silva | |
| 8,023,215 B1 | 9/2011 | Ghaly et al. | |
| 8,806,117 B2 | 8/2014 | Islam et al. | |
| 8,819,380 B2 | 8/2014 | Patil et al. | |
| 8,825,980 B2 | 9/2014 | Patil et al. | |
| 8,976,478 B1 | 3/2015 | Harlee, III et al. | |
| 9,099,155 B1 | 8/2015 | Kataria et al. | |
| 9,330,701 B1 | 5/2016 | Michel et al. | |
| 9,502,061 B1 | 11/2016 | Zhu et al. | |
| 9,672,845 B2 | 6/2017 | Rausch | |
| 9,679,601 B2 | 6/2017 | Gao et al. | |
| 2006/0066971 A1 | 3/2006 | Alex et al. | |
| 2008/0174905 A1 | 7/2008 | Ueda | |
| 2008/0288741 A1* | 11/2008 | Lee | G06F 11/364 711/200 |
| 2013/0235486 A1 | 9/2013 | Hirose | |
| 2016/0077962 A1* | 3/2016 | Ehrlich | G06F 12/0246 711/103 |

OTHER PUBLICATIONS

Kaitsu, Isatake et al., "Ultra High Density Perpendicular Magnetic Recording Technologies", Manuscript received Jul. 15, 2005, FUKITSU Sci. Tech. J., 42, 1, pp. 122-130, Jan. 2006, 9 pages.

* cited by examiner

*Primary Examiner* — Jae U Yu
(74) *Attorney, Agent, or Firm* — Westman, Champlin & Koehler, P.A.

(57) ABSTRACT

An apparatus includes a data storage medium having a plurality of tracks. The apparatus also includes a write history buffer configured to store a history of prior write commands to the plurality of tracks. The apparatus further includes a controller communicatively coupled to the write history buffer. The controller is configured to receive a new write command directed to a first portion of a first track of the plurality of tracks on the data storage medium. The controller is further configured to determine whether to update ATI contribution measures from the first track based on the history of write commands to the first track.

20 Claims, 4 Drawing Sheets

MANAGING ADJACENT TRACK INTERFERENCE IN A DATA STORAGE DEVICE

SUMMARY

In one embodiment, a method includes receiving a new write command directed to a first portion of a track on a data storage medium. The method also includes determining, from a history of prior write commands to the track, whether any of the prior write commands were directed to portions of the track that at least partially overlap with the first portion. The method further includes updating adjacent track interference (ATI) contribution measures from the track upon determining that one or more of the prior write commands were directed to portions of the track that at least partially overlap with the first portion.

In another embodiment, a data storage system includes a data storage medium having a plurality of tracks. The data storage system also includes a write history buffer configured to store a history of prior write commands to the plurality of tracks. The data storage system further includes a controller communicatively coupled to the write history buffer. The controller is configured to receive a new write command directed to a first portion of a first track of the plurality of tracks on the data storage medium. The controller is also configured to determine, from the history of prior write commands to the first track in the write history buffer, whether any of the prior write commands were directed to portions of the first track that at least partially overlap with the first portion. The controller is further configured to update ATI contribution measures from the first track upon determining that one or more of the prior write commands were directed to portions of the first track that at least partially overlap with the first portion.

In yet another embodiment, an apparatus includes a data storage medium having a plurality of tracks. The apparatus also includes a write history buffer configured to store a history of prior write commands to the plurality of tracks. The apparatus further includes a controller communicatively coupled to the write history buffer. The controller is configured to receive a new write command directed to a first portion of a first track of the plurality of tracks on the data storage medium. The controller is further configured to determine whether to update ATI contribution measures from the first track based on the history of write commands to the first track.

This summary is not intended to describe each disclosed embodiment or every implementation of managing adjacent track interference in a data storage device as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Figure 1A:
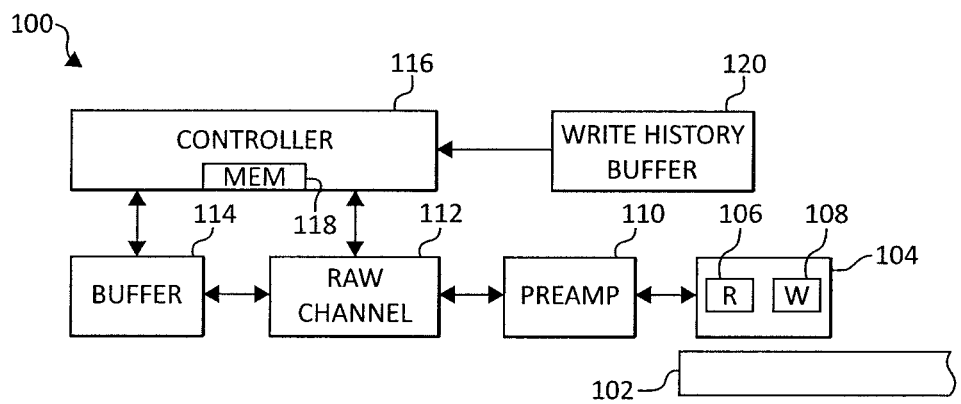
FIG. 1A is a functional block diagram of a data storage device in accordance with an embodiment of the disclosure.

Embodiments of the disclosure relate to managing adjacent track interference (ATI) in a data storage device.

A hard disc drive (HDD) is an example of a data storage device in which data is written on tracks on a disc surface. Each time writing is performed on a track, neighboring tracks may be partially overwritten due to ATI. However, a track includes a number of sectors, and therefore if only a portion of the track (e.g., a first subset of sectors) is written to during a particular write operation, there is no ATI contribution from the remaining unwritten portion (e.g., a second disjoint subset of sectors) of the track for that write operation. In current ATI measuring systems, a drive may update ATI contribution measures from a track (e.g., ATI measures of neighboring tracks that may be partially overwritten) every time the track is written. Once the ATI measure of a track reaches a predetermined threshold, a directed offline scan, or similar error detection and correction operation, may be carried out to alleviate the effects of ATI.

Since, as indicated above, there is no contribution to ATI from portions of a track that are not written to during a particular write operation, two separate writes occurring at different times—one at a first time to the first subset of sectors, and the other at a second time to the second disjoint subset of sectors—should actually be equivalent to a singular write for purposes of updating ATI contribution measures from the track. However, as noted above, current ATI measuring systems simply update the ATI contribution measures based on any write to the track, and therefore such systems will update the ATI contribution measures twice (once for each of the two separate non-overlapping writes), and may ultimately prematurely trigger a directed offline scan.

Embodiments of the disclosure recognize the problem of unnecessary updates to ATI contribution measures, and avoid such unnecessary ATI-related measurement updates. Details regarding the different embodiments are provided below in connection with FIGS. 1A-2.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1A is a simplified block diagram of a data storage device 100 in which embodiments of the disclosure may be useful. The device 100 is characterized as a HDD to which data are stored on one or more rotatable data recording media (e.g., one or more discs) 102, although this is merely exemplary and not limiting.

The medium 102 is accessed by a data read/write transducer (head) 104 which is supported adjacent the rotating medium during device operation. The head 104 includes one or more read elements (R) 106 and one or more write elements (W) 108. The head 104 can include other functional elements as well such as fly-height control elements, contact and/or proximity sensors, etc.

A preamplifier/driver circuit (preamp) 110 applies signal preconditioning and preamplification to read signals from the read element(s) 106 during data read operations, and supplies write currents to the write element(s) 108 during data write operations. A read/write (R/W) channel 112 provides data encoding/decoding, a buffer memory 114 provides temporary storage of data during data transfer operations, and a controller 116 provides top level control of the device 100. The controller 116 may constitute a programmable processor that uses programming steps and control parameters in local controller memory 118. The controller functionality may alternatively be realized in hardware and/or incorporated into the other operative blocks shown in FIG. A. Device 100 may also include a write history buffer 120, which may be employed to store write history data that is described herein in connection with FIG. 1C.

Figure 1B:
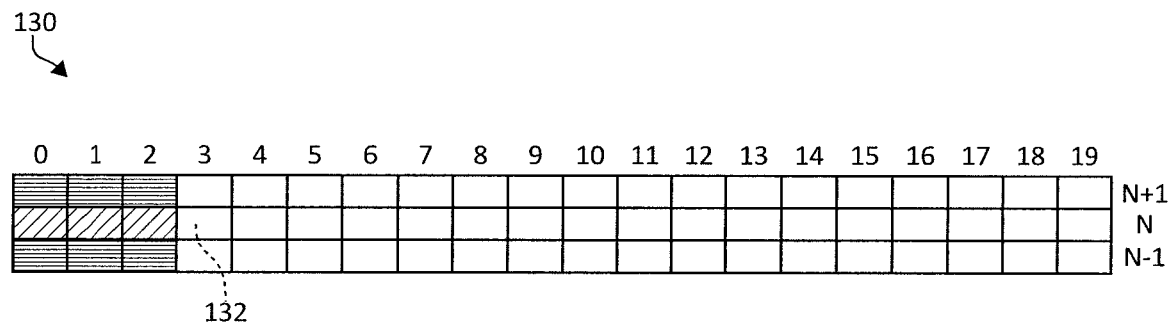
FIG. 1B is a diagrammatic illustration of tracks on a data storage medium that may be incorporated into the data storage device of FIG. 1A.

FIG. 1B is a diagrammatic illustration of adjacent concentric tracks 130 that may be formed on the storage medium 102 of FIG. 1A in accordance with some embodiments. The tracks 130 are arbitrarily denoted as Tracks N−1, N and N+1 where N is an integer. It will be appreciated that FIG. 1B only shows a small subset of the concentric tracks that can extend from the innermost diameter to the outermost diameter of the medium. The tracks 130 are characterized as standard, non-shingled tracks so that data write operations can be carried out to any of the respective tracks in any order without the need to reformat the tracks (apart from periodic refreshing operations carried out responsive to the detection of ATI). It should be noted that non-shingled tracks are merely used as a non-limiting example, and different types of tracks may be employed in different embodiments.

A track centerline for track N is represented by broken line 132. During a write operation to Track N, the associated write element 108 (FIG. 1A) will be positioned so as to be nominally centered over this centerline as the medium rotates adjacent the head 104. It will be appreciated that during a subsequent read operation, the read element 106 will generally be positioned to follow the centerline 132 as well.

The write element 108 writes data to Track N (and to each of the other tracks) by using magnetic write fields that establish a magnetic sequence (pattern) in one or more internal recording layers of the media 102. Due to a variety of factors such as the shape and construction of the write element and the position of the write element relative to the centerline of Track N, relatively small magnetic fringing fields may tend to encroach onto the edge portions of the adjacent Tracks N−1 and N+1. It should be noted that other neighboring tracks that are not shown in FIG. 1B (e.g., N−2, N−3, . . . , as well as N+2, N+3, . . . ) may as well be affected by writes to Track N.

A single write operation to Track N may result in magnetic fringing fields that have little, if any, practical effect upon the magnetization patterns of Tracks N−1 and N+1 and other neighboring tracks. Over time, however, the accumulated effects of the fringing fields from multiple successive writes to Track N can reach the point where the magnetization patterns of the adjacent Tracks N−1 and N+1 (and possibly other neighboring tracks) become degraded.

Since writing to Track N may contribute to the ATI of Tracks N−1 and N+1 and other neighboring tracks, maintaining ATI measures of Tracks N−1 and N+1 and the other neighboring tracks may account for the contribution of ATI from writes to Track N. The amount by which the ATI contribution measures are increased is implementation specific. Thus, in some embodiments, the mechanism for tracking ATI may not be a simple counter, but rather for example a function that uses adjacent writes as one input (but not the only input). For example, a second ATI contribution input may be a value proportional to the distance between the write and the center of the track. Further, updates to ATI measures may be scaled by distance from the write. For example, a track (e.g., N−2) that is more distant from Track N than Track N−1 may have a smaller ATI from a write to Track N relative to the ATI that Track N−1 experiences from the write to Track N, and therefore Track N−2's ATI measure may, for example, be increased by a smaller amount relative to Track N−1's ATI measurement increase.

In the examples provided below, in the interest of simplification, it is assumed that ATI from a write to Track N impacts only Tracks N−1 and N+1 and that updates to the ATI contribution measures from a write to Track N involve incrementing the ATI measures of each of Tracks N−1 and N+1 by 1. Thus, for the examples provided below, increases in the ATI contribution measures from Track N by 1 mean an increase in the ATI measure of Track N−1 by 1 and an increase in the ATI measure of Track N+1 by 1.

In the example shown in FIG. 1B, it is assumed that Tracks N−1, N and N+1 include 20 sectors (sector 0 through sector 19). In an example write operation, write element 108 writes data to sectors 0-2 of Track N. In this write operation, relatively small magnetic fringing fields may encroach onto edge portions of sectors 0-2 of the adjacent Tracks N−1 and N+1. However, the write operation to sectors 0-2 of Track N does not result in magnetic fringing fields encroaching onto the remaining sectors 3-19) of the adjacent Tracks N−1 and N+1. Thus, in embodiments of the disclosure, if the ATI contribution measures from Track N are incremented by 1 for the write operation to sector 0-2, a next write operation to, for example, sectors 6-10 will not result in an increase of the ATI contribution measures from Track N because sectors 6-10 and 0-2 are disjoint subsets of sectors. Details regarding how controller 116 (FIG. 1A) maintains accumulated ATI contribution measures from Track N of the tracks 130, and avoids unnecessary ATI contribution measurement updates (e.g., increments) are provided herein in connection with FIG. 1C. In the interest of simplification, Tracks N−1 and N+1 are not shown in FIG. 1C.

Figure 1C:
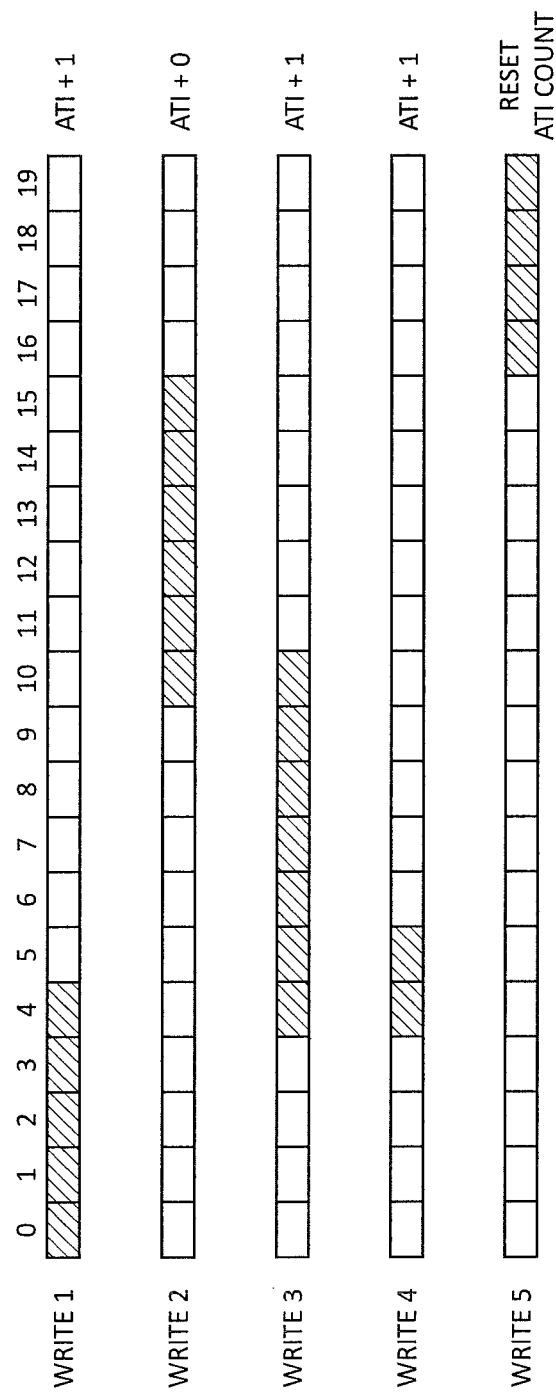
FIG. 1C is a diagrammatic illustration showing example writes to a track of the tracks shown in FIG. 1B.

FIG. 1C illustrates different example write operations to Track N of tracks 130 (of FIG. 1B). For purposes of the example, it is assumed that Track N incudes 20 sectors (sector 0 through sector 19). In general, a track such as Track N may include any suitable number of sectors. It is also assumed that the ATI contribution measures form Track N are set/reset to initial values (e.g., 0s) prior to the example write operations. As can be seen in FIG. 1C, a first write operation includes writing to sectors 0-4 of Track N. A first write command (Write 1) for the write operation may be received in data storage device 100 (of FIG. 1A) from a host (not shown) and may include a starting sector number (e.g., sector 0), a write command length (e.g., 5), and the data to be written. Upon completion of the first write command, controller 116 (of FIG. 1A) may, for example, increment the ATI contribution measures form Track N by 1 in memory 118. As indicated above, in the example of FIG. 1C, the initial ATI contribution measures from Track N are each 0 and therefore the increments in the ATI contribution measures from Track N provide updated ATI contribution measures of 1 for each of Tracks N−1 and N+1. Additionally, controller 116 may store at least some of the first write command information (e.g., the starting sector number (sector 0) and the command length (5)) into write history buffer 120 (of FIG. 1A). In some embodiments, any data (e.g., user data) that is a part of the write command may not be stored in write history buffer 120 since location information of the historical writes, and not the data content, may be used to for ATI calculations for different tracks.

A second write command (Write 2) directed to Track N may then be received in data storage device 100 from the host. The second write command may include a starting sector number (e.g., sector 10), a write command length (e.g., 6), and the data to be written. Controller 116 may determine, from information in write history buffer 120 that there is no overlap between the first and second write commands, and therefore controller 116 may complete the second write command, and not increment the ATI contribution measures from Track N in memory 118. Thus, the ATI contribution measures from Track N remain equal to 1 for each of Tracks N−1 and N+1 after the second write operation. Controller 116 may store at least some of the second write command information (e.g., the starting sector number (sector 10) and the command length (6)) into write history buffer 120.

After the second write command, a third write command (Write 3) directed to Track N may be received in data storage device 100 from the host. The third write command may include a starting sector number (e.g., sector 4), a write command length (e.g., 7) and the data to be written. Controller 116 may determine, from information in write history buffer 120, that there is an overlap between the first and third write commands at sector 4, and also an overlap between the second and third write commands at sector 10. Since a maximum number of overlaps at any sector of Track N is 2, and the ATI contribution measures from Track N in memory 118 are 1 for each of Tracks N−1 and N+1, controller 116 may complete the third write command and update the ATI contribution measures from Track N in memory 118 to 2 for each of Tracks N−1 and N+1. Controller 116 may store at least some of the third write command information (e.g., the starting sector number (sector 4) and the command length (7)) into write history buffer 120. Alternatively, since the ATI contribution measures are already incremented (after the overlap is determined), information for the first, second and third write commands may be merged and stored as a single command in write history buffer 120, thereby saving storage space. Information for the single merged write command may include a starting sector (e.g., sector 0) and a command length of 16.

A fourth write command (Write 4) directed to Track N may then be received in data storage device 100 from the host. The fourth write command may include a starting sector number (e.g., sector 4), a write command length (e.g., 2) and the data to be written. Controller 116 may determine, from information in write history buffer 120, that there is an overlap of the first, third fourth write commands at sector 4 and also an overlap between the third and fourth write commands at sector 5. Since a maximum number of overlaps at any sector of Track N is 3 (at sector 4) and the ATI contribution measures in memory 118 are 2 for each of Tracks N−1 and N+1, controller 116 may complete the fourth write command and update the ATI contribution measures from Track N in memory 118 to 3. Controller 116 may store at least some of the fourth write command information (e.g., the starting sector number (sector 4) and the command length (2)) into write history buffer 120. Alternatively, after the ATI contribution measures are incremented, information related to the fourth command may be merged with the prior command information for Track N in write history buffer 120 and stored as single command information in buffer 120, thereby saving storage space.

After the fourth write command, a fifth write command (Write 5) directed to Track N may be received in data storage device 100 from the host. The fifth write command may include a starting sector number (e.g., sector 16), a write command length (e.g., 4), and the data to be written. Controller 116 may determine, from information in write history buffer 120, that there is an overlap between the fifth write command and the prior write commands (Write 1-Write 4). Thus, the ATI contribution measures are not incremented. Further, completion of the fifth write command results in all sectors of Track N being written. In some embodiments, when all sectors of a track are written, the ATI measure for that track may be reset (e.g., to 0). Details regarding resetting of ATI measures are described further below. A description of a general method of measuring ATI contribution is provided below in connection with FIG. 2.

Figure 2:
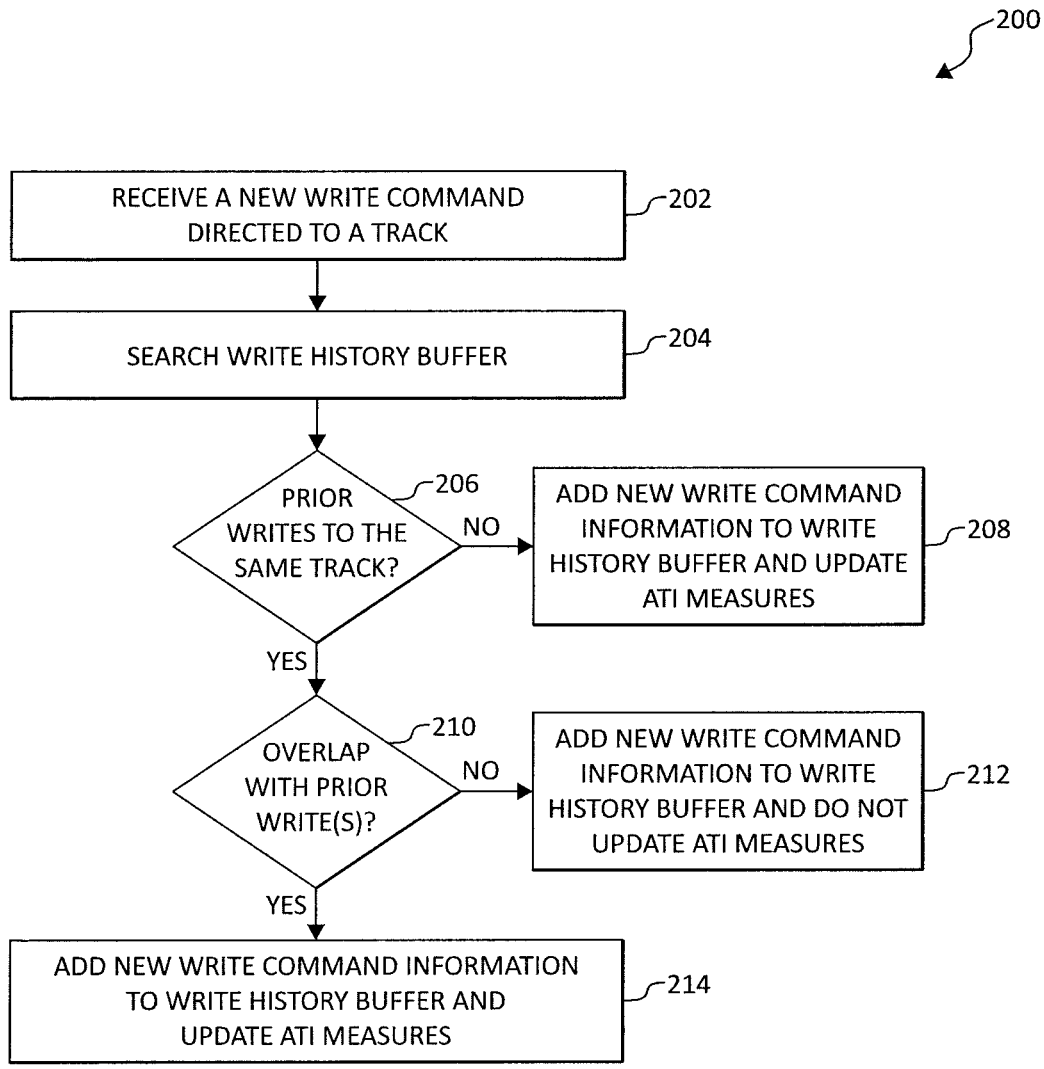
FIG. 2 is a flow diagram of a method embodiment.

FIG. 2 is a flowchart of a method 200 in accordance with one embodiment. At step 202, a new write command to write data on a track of a disc is received. At 204, a buffer memory including historical disc write information is searched using identification information for the track. At 206, a determination is made as to whether the historical disc write information includes prior writes to the same track. If no prior writes to the track are found, control passes to 208. At 208, information related to the new write command is added to the write history buffer, and ATI contribution measures from the track are updated. If one or more prior writes to the track are found, control passes to 210. At 210, a determination is made as to whether at least a portion of the new write overlaps the one or more prior writes to the track. If no overlap is found, information related to the new write command is added to the write history buffer at 212, and the ATI contribution measures from the track in not updated. It should be noted that, if the new write command is non-overlapping, but is connected to either a front or an end of a prior command stored in the buffer memory, the new write command information may be merged with the prior write command information. If an overlap between the new and prior command(s) is found, the ATI contribution measures may be updated at 214, and the information related to the new write command may be merged with the write information for the prior commands in the write history buffer.

As noted above, since writing to Track N (of FIG. 1B) contributes to the ATI of Tracks N−1 and N+1 (of FIG. 1B), maintaining ATI measures of Tracks N−1 and N+1 may account for the contribution of ATI from Track N. Thus, in different embodiments, ATI contribution measures and/or ATI measures for the different tracks may be maintained. It should be noted that, when a track is fully written, the ATI measure may be reset (to 0, for example). The resetting of the ATI measure may be based on the observation that once a track is fully written with new data, the effects of any previously applied fringing fields to that track from adjacent tracks will be substantially eliminated since the newly written data "resets" any previously encroached portions of the track.

Figure 3A:
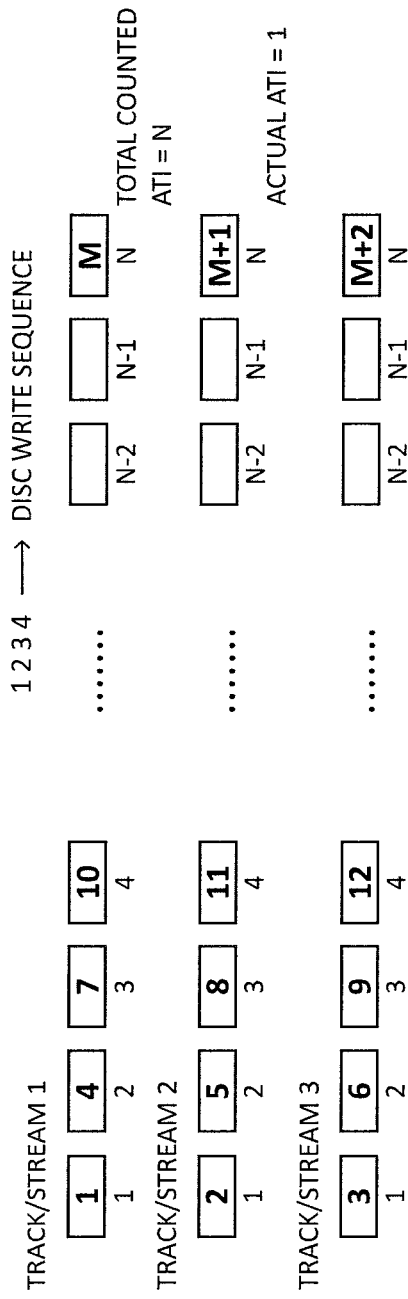
FIG. 3A is a diagrammatic illustration of an example of a fragmented sequential write.

The above-described embodiments for managing ATI are well-suited for video surveillance systems. Large sequential block transfers are typically found in video files generated in surveillance systems. In a HDD, writing data may generally be performed sequentially on a track. However, in HHDs employed in video surveillance systems, video file data may be written in multiple streams (e.g., Stream 1, Stream 2, Stream 3 to 3 different tracks as shown in FIG. 3A). As can be seen in FIG. 3A, the write sequence of the video data blocks is 1, 2, 3, 4 . . . , M, M+1, M+2, etc., where M is an integer. The example write operation shown in FIG. 3A is viewed as a fragmented sequential write from the point of view of a disc. As indicated above, in current ATI management systems, the minimum resolution of ATI counting is per track. Thus, in such systems, the fragmented and moving repeated writes in each of the 3 different tracks of FIG. 3A will be measured as extra ATI, thereby prematurely triggering a directed offline scan. Device offline scans are background tasks that contribute substantially to causing long command completion times (CCTs). In video surveillance systems, long CCTs may result in one or more video frames being lost during recordings, and video frames freezing during playback. In current ATI measurement systems, when N different blocks of Stream 1 video data are written to the top-most track of FIG. 3A, the ATI contribution measure from that track will be N (assuming a simple count). However, with the ATI measurement scheme of the disclosure, the ATI contribution from writing Stream 1 is 1 (assuming a simple count) because the writes to different non-overlapping portions of the track are equivalent to a singular write for purposes of updating ATI contribution measures.

Figure 3B:
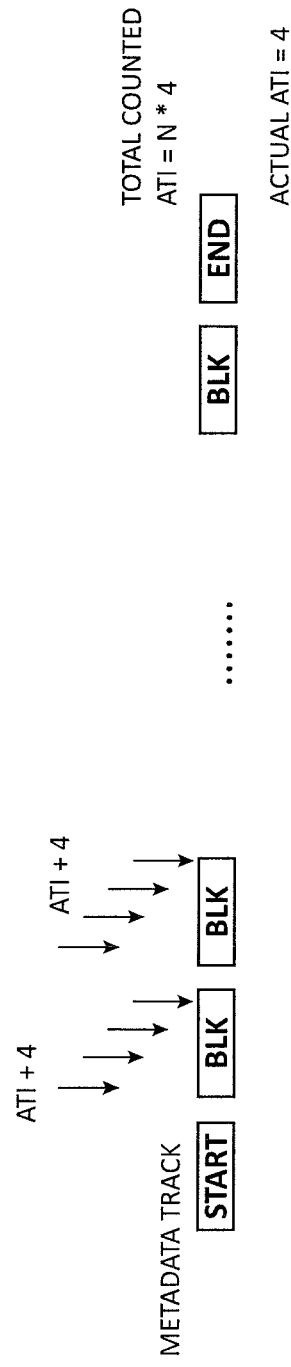
FIG. 3B is a diagrammatic illustration of an example of a moving overlapped write.

FIG. 3B is a diagrammatic illustration showing metadata writes in a video surveillance system. As can be seen in FIG. 3B, metadata updates may involve repeated writes (e.g., 4 writes) to a same address (e.g., sector or block (Blk in FIG. 3B)), and then a move to a next address. In the example shown in FIG. 3B, in current ATI measurement systems, the ATI contribution measure for the metadata track would be N*4 (assuming a simple count). However, with the ATI measurement scheme of the disclosure, the ATI contribution from writing to the metadata track is 4.

From the foregoing, it is clear that the ATI management embodiments of the disclosure may significantly reduce the frequency of device offline scans in systems (e.g., video surveillance systems), thereby having a positive impact on CCTs.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
receiving a new write command directed to a first portion of a track on a data storage medium;
determining, from a history of prior write commands to the track, whether any of the prior write commands were directed to portions of the track that at least partially overlap with the first portion; and
updating adjacent track interference (ATI) contribution measures from the track to one or more adjacent tracks upon determining that one or more of the prior write commands were directed to portions of the track that at least partially overlap with the first portion.

2. The method of claim 1 and further comprising not updating the ATI contribution measures from the track upon determining that none of the prior write commands were directed to portions of the track that at least partially overlap with the first portion.

3. The method of claim 1 and further comprising storing information related to the prior write commands and information related to the new write command in a write history buffer.

4. The method of claim 1 and further comprising, upon determining that one or more of the prior write commands were directed to portions of the track that at least partially overlap with the first portion, merging information related to the one or more prior write commands with information related to the new write command, and storing the merged information in a write history buffer.

5. The method of claim 1 and further comprising:
determining whether any of the prior write commands are contiguous with the new write command; and
upon determining that one or more of the prior write commands are contiguous with the new write command, merging information related to the one or more prior write commands with information related to the new write command, and storing the merged information in a write history buffer.

6. The method of claim 1 and further comprising updating the ATI contribution measures from the track when the new write command directed to the track is received and when a determination is made that there is no history of prior write commands to the track.

7. The method of claim 1 and wherein, when the first portion of the track to which the new write command is directed to at least partially overlaps with multiple portions of the track that multiple ones of the prior commands were directed to, updating the ATI contribution measures from the track based on a portion of maximum overlap.

8. The method of claim 1 and wherein the new command is a part of a fragmented sequential write.

9. A data storage system comprising:
a data storage medium comprising a plurality of tracks;
a write history buffer configured to store a history of prior write commands to the plurality of tracks; and
a controller communicatively coupled to the write history buffer, the controller configured to:
receive a new write command directed to a first portion of a first track of the plurality of tracks on the data storage medium;
determine, from the history of prior write commands to the first track in the write history buffer, whether any of the prior write commands were directed to portions of the first track that at least partially overlap with the first portion; and
update adjacent track interference (ATI) contribution measures from the first track to one or more adjacent tracks upon determining that one or more of the prior write commands were directed to portions of the first track that at least partially overlap with the first portion.

10. The data storage system of claim 9 and wherein the controller is further configured to update the ATI contribution measures from the first track when there is no history of prior write commands for the first track in the write buffer.

11. The data storage system of claim 9 and wherein the controller is further configured to not update the ATI contribution measures for the track upon determining that none of the prior write commands were directed to portions of the track that at least partially overlap with the first portion.

12. The data storage system of claim 9 and wherein the controller is further configured to store information related to the prior write commands and information related to the new write command in the write history buffer, the information related to the prior write commands forming the history of the prior write commands.

13. The data storage system of claim 9 and wherein the controller is further configured to, upon determining that one or more of the prior write commands were directed to portions of the first track that at least partially overlap with the first portion, merge information related to the one or more prior write commands with information related to the new write command, and store the merged information in the write history buffer.

14. The data storage system of claim 9 and wherein the controller is further configured to:
   determine whether any of the prior write commands are contiguous with the new write command; and
   upon determining that one or more of the prior write commands are contiguous with the new write command, merge information related to the one or more prior write commands with information related to the new write command, and store the merged information in the write history buffer.

15. The data storage system of claim 9 and wherein the controller is further configured to, when the first portion of the first track to which the new write command is directed to at least partially overlaps with multiple portions of the first track that multiple ones of the prior commands were directed to, update the ATI contribution measures from the first track based on a portion of maximum overlap.

16. An apparatus comprising:
   a data storage medium comprising a plurality of tracks;
   a write history buffer configured to store a history of prior write commands to the plurality of tracks; and
   a controller communicatively coupled to the write history buffer, the controller configured to:
      receive a new write command directed to a first portion of a first track of the plurality of tracks on the data storage medium; and
      determine whether to update adjacent track interference (ATI) contribution measures from the first track to one or more adjacent tracks based on the history of write commands to the first track.

17. The apparatus of claim 16 and wherein the controller is further configured to determine whether to update the ATI contribution measures from the first track based on the history of the write commands to the first track by:
   determining, from the history of prior write commands to the first track, whether any of the prior write commands were directed to portions of the track that at least partially overlap with the first portion; and
   updating the ATI contribution measures from the first track upon determining that one or more of the prior write commands were directed to portions of the first track that at least partially overlap with the first portion.

18. The apparatus of claim 17 and wherein the controller is further configured to update the ATI contribution measures for the first track when there is no history of prior write commands for the first track.

19. The apparatus of claim 17 and wherein the controller is further configured to not update the ATI contribution measures from the first track upon determining that none of the prior write commands were directed to portions of the first track that at least partially overlap with the first portion.

20. The apparatus of claim 17 and wherein the controller is further configured to, upon determining that one or more of the prior write commands were directed to portions of the first track that at least partially overlap with the first portion, merge information related to the one or more prior write commands with information related to the new write command, and store the merged information in the write history buffer.

* * * * *